3,259,464
PROCESS FOR IMPARTING ANTI-DUSTING PROPERTIES TO ABSORBENTS AND PRODUCT PRODUCED THEREBY
James A. Avtges, Watertown, Mass., and Robert G. Shaver, Burke, Va., assignors to W. R. Grace & Co., Cambridge, Mass., a corporation of Connecticut
Filed Apr. 5, 1963, Ser. No. 271,015
The portion of the term of the patent subsequent to July 31, 1979, has been disclaimed
11 Claims. (Cl. 23—252)

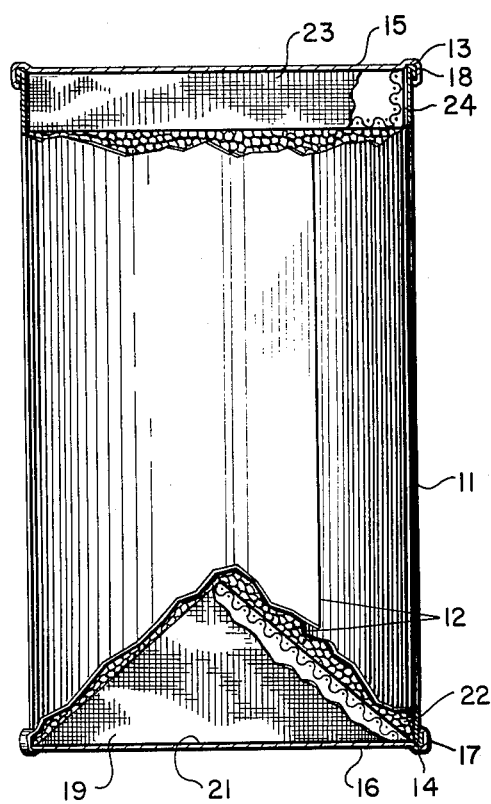

This application is a continuation-in-part of application Serial No. 779,379, filed December 10, 1958, and now abandoned.

This invention relates to metallic hydroxide absorbent mixtures of the soda lime type which are treated to render the same substantially free of dust.

Most generally absorbent limes are produced by mixing calcium hydroxide with other metallic hydroxides, such as sodium, potassium and barium hydroxide and mixtures thereof, and water. In one instance, the calcium hydroxide is mixed with sodium hydroxide and water, while in another instance, the calcium hydroxide is mixed with barium hydroxide, particularly a barium hydroxide in the octahydrate state. The product of this reaction is usually produced in the form of a plastic mass which is later ground into granules. These granules are small and their physical shapes are somewhat irregular. They are subsequently classified into sizes by means of screens and are loaded into containers for shipment. When these containers are roughly handled during shipping the granules abrade each other and wear off sharp corners thereby generating fines and dust.

It has long been known that the dust particles associated with these absorbent lime products are very troublesome. It has been found that this dust interferes with many of the functions for which such absorbent mixtures are used. As an illustration, industry has recognized the inherent ability of these lime products to absorb acidic gases, and many hospitals have utilized the same to extract carbon dioxide from an anesthesia gas system. The flow of the anesthesia stream is usually directed through a bed of these absorbent mixtures during the extraction stage of the system. Most usually this system operates quite well. However, in cases where there is a relatively large amount of dust, it may be borne out of the bed by the current passing through the system. It is apparent that this suspended dust, which may be inherently caustic, could be very dangerous to the patient under anesthesia.

Another situation in which the dust particles have raised a troublesome problem is in the recharging of the absorbent bed in the anesthesia system. A common recharging technique involves pouring the granules of these absorbent mixtures into the empty absorbent housing from a pail or similar receptacle. This procedure generates a cloud of dust which contaminates the atmosphere of the operating room. Also, due to the inherent caustic nature of these lime products, the dust may have a damaging effect upon the surfaces with which it comes in contact. It has further been found that if the absorbent housing is relatively small, the tendency is to add the absorbent to the housing without any attempt to remove this dust and this practice has been found to ultimately decrease the margin of safety with which the system may be operated. Conversely, if the absorbent housing is comparatively large, there is a tendency to discard that portion of the solid granules which contain any substantial quantity of dust which is a very uneconomical practice.

Industry has recognized the difficulties that may be encountered when a relatively large amount of dust is present in the commercially-available carbon dioxide absorbent. In many cases, attempts were made to solve these difficulties by providing the individual absorbent granule with a protective coating. In some cases, aqueous solutions of glue-like materials, for instance dextrines, are used for this purpose. Many glue-like coatings do decrease the dusting tendency of these lime products by encapsulating the individual granules. However, it has also been found that these glue-like materials also lower the absorptive efficiency of the absorbent products.

In other cases, special plastic or rubberlike polymers are used for coating these granules. Many of these polymeric materials not only prevent dusting but also obtain this effect without seriously impairing the absorptive ability of the lime mixtures. The difficulty with these materials is that they are applied to the granule by means of a dispersion in an organic or aqueous medium. If an organic solvent medium is selected, it must be stripped from the granule before it is used. Not only are solvent recovery systems quite expensive but there is always the possibility that the solvent will not be completely stripped from the granule. In such cases, the absorbent may be odorous. It is apparent that if the solvents are toxic that trace amounts in the absorbent would prohibit its use for many functions. This would be expecially true if these lime mixtures were to be used as absorbents in an anesthesia flow system. If the anti-dusting component is applied to the surface of the granule by means of an aqueous dispersion, then care must be taken to insure that it is uniformly dispersed in the medium. Also, care must be taken to insure that the moisture added to the granule does not increase the moisture content above about 20 percent. It has been found that if the moisture content of these absorbent lime products is above about 20 percent the absorptive efficiency of the granule is adversely affected. Usually if the granule contains too much moisture, a heating cycle will have to be incorporated into the operation to bring the moisture content below this range.

We have discovered that granules of these lime mixtures may be treated in such a manner that they will remain substantially dust free without affecting their capacity to absorb carbon dioxide. The treatment consists in the physical admixture of 0.5 percent to 3.0 percent of a solid carboxymethylcellulose salt with the particles of these lime mixtures and the water contained in said particles.

The concept which underlies this treatment may be described as follows:

Sodium carboxymethylcellulose is a hydrophilic substance having a mobile cation which is susceptible to hydration. Initially this salt is physically admixed with granules of these absorbent mixtures. During this mixing stage, the surfaces of the particles of the various substances come in contact with each other. Due to this contact and the hydrophilic nature of the sodium carboxymethylcellulose, some of the moisture within the individual particles of these absorbent mixtures will be attracted to the surfaces of the salt. As a result, the solid sodium carboxymethylcellulose is solvated and transformed into a colloidal gummy mass. This gummy mass will adhere itself to the surfaces of the individual absorbent granules during the mixing stage. Some of the dust will agglomerate to form relatively larger fine particles while some dust will adhere to the larger particles thereby increasing their size. This agglomeration and adhering effect is mainly due to the gumminess of the colloid and its contact with various particles in the system.

In accordance with this concept, the degree of tackiness of this hydrophilic gum is related to the molecular weight of the sodium carboxymethylcellulose. As previously stated, the granules of these absorbent lime products are initially mixed with the solid carboxymethylcellulose. If this salt has a relatively low molecular weight, the individual granules of these absorbent mixtures will retain their free flowing nature. If the molecular weight of this salt is comparatively high, these absorbent granules will be transformed into a non-flowing, plastic mass depending on the quantity used. In either case the product of this treatment will be dust free and its absorptive capacity will be unaffected. Initially, of course, the absorbent should have some free moisture. preferentially, the moisture content of the absorbent mixture which are to be treated should be between about 5 percent to about 19 percent.

Although we have described the use of sodium carboxymethylcellulose in the present treatment, there are a number of other materials which may be used. Any powdery hydrophilic material which contains a mobile cation or anion which is susceptible to hydration may be used if this powdery material may be transformed into a colloid on contact with water. For instance, potassium or other alkali metal salts of carboxymethylcellulose are suitable. Mixtures of such salts are also operative.

If it is desired to render these free-flowing particles dustless then sodium carboxymethylcellulose, in an amount between about 0.5 percent and about 1.5 percent by weight, is physically mixed therewith. This sodium carboxymethylcellulose is of the extra low molecular weight type such as that commercially available under the trade name CMC–7A from the Hercules Powder Company. The amount of this hydrophilic salt, expressed as percent by weight, is based upon the total weight of the particles which are to be treated. It has been found that if an amount above about 1.5 percent is used that the free-flowing character of the individual particles of these absorbent mixtures will be impaired. However, there will not be enough of this hydrophilic salt present to cover all of the surfaces of the granules of these absorbents if an amount below about 0.5 percent is used. Very satisfactory results have been achieved when the amount of this hydrophilic salt which was utilized to render these free-flowing granules substantially dustless was about 1.0 percent by weight.

If it is desired to transform these free-flowing absorbent particles into a dustless, non-shifting, plastic mass then sodium carboxymethylcellulose, in an amount between about 1.5 percent and 3.0 percent by weight, is physically mixed therewith. This sodium carboxymethylcellulose is of the high molecular weight type such as that commercially available under the trade name of CMC–7H from the Hercules Powder Company. Again, the amount of this hydrophilic salt, expressed as percent by weight, is based upon the total weight of the absorbent particles which it is desired to treat. Generally, the maximum limit on usage will be dependent upon economics and the ultimate use of the mass. Optimum results have been obtained when about 2.0 percent by weight of this carboxymethylcellulose salt was used to perform the aforedescribed functions by means of this treatment.

It has also been discovered that a free-flowing particle can be obtained if a high molecular weight carboxymethylcellulose salt is used in amounts ranging between about 0.5 percent to 1.0 percent and the moisture content of the soda lime particles is maintained between about 16 percent to 19 percent. Using amounts of the high molecular weight salt above 1 percent markedly changes the flowability of the lime particles while an amount below 0.5 percent was not adequate to prevent dusting at these moisture concentrations.

This treatment is especially adaptable in preparing charges for disposable absorbent canisters of the type used in anesthesia systems. The conventional canister, which is removable from the anesthesia circuit, is charged by merely pouring the absorbent therein. When this conventional canister is roughly handled the particles of this absorbent mixture are subject to attrition due to the abrasion of the individual granules with each other. A relatively large amount of dust is generated due to this attrition and many of the troublesome problems heretofore described are again encountered. We have found that we may combat these problems by pre-treating the particles of this absorbent charge with an alkali metal salt of carboxymethylcellulose. Individual particles of the absorbent mixture are treated with this salt by admixing these substances together and thereafter charging the dustless free-flowing admixture into the canister.

FIGURE 1 sets forth a type of canister which contains an absorbent charge 22 which has been treated in the aforesaid manner. The body of the canister 11 is in the shape of a hollow cylinder whose longitudinal edges 12 are secured in overlapping relationship to each other. The extremital ends 13, 14 of this canister are provided with end closures 15, 16 which are secured to the sides adjacent each of the extremital ends of the cylinder by means of double seams 17 and 18. A screen 19 in the form of a cone is positioned within the canister. The base of this cone rests upon the innermost side 21 of the lower end closure 16. The diameter of the cone's base is slightly less than the inside diameter of the cylinder. The particles 22 of the absorbent charge rest upon the outer convex area of the cone. A flat surfaced circular screen insert 23 is positioned upon the upper surface of the soda lime mass. The diameter of this circular screen is slightly less than the inside diameter of the canister. This flat circular screen 23 has a lap edge 24 which extends laterally from the circumference of the screen. This lap edge 24 projects towards the uppermost extremital end of the canister 13 when the circular screen 23 is inserted therein. This above described canister has been especially designed to be used in connection with a particular anesthesia circuit.

An absorbent mixture, such as soda lime, is treated with sodium carboxymethylcellulose of a high molecular weight. While this soda lime is still free-flowing it is charged into this canister upon the top convex surface of the cone. The canister is allowed to stand for about 5 minutes during which time the sodium carboxymethylcellulose will act as a packing stabilizer. The sodium carboxymethylcellulose at this point is in contact with the surfaces of the soda lime granule. This hydrophilic substance will swell due to its contact with the moisture from within the soda lime granule. This swelling effect compacts the entire soda lime charge within the canister. Also the gumminess of the sodium carboxymethylcellulose seems to render the soda lime charge more coherent and resilient. Due to this resiliency the soda lime charge is rendered more resistant to attrition and settling. It has been found that the canister may now be roughly handled without incurring these effects to any large degree. By preventing a substantial degree of settling and attrition by this treatment the problems of dusting and channeling are also substantially reduced. This treatment is especially unique because it does not in any way alter the effective absorptive capacity of the individual particles of the absorptive system.

The results of a typical evaluation of an absorbent which could be used in a carbon dioxide extraction apparatus of an anesthesia system is set forth in the following table:

TABLE

| Mesh size in granules | Percent by weight of anti-dusting agent used | Carbon dioxide breakpoint, minutes |
|---|---|---|
| 4 to 8 mesh | | 65 |
| 4 to 8 mesh | 0.8 | 65 |

As is apparent from the comparison set forth in the table, the present anti-dusting treatment has no effect on the carbon dioxide absorptive efficiency of soda lime.

These life-tests were conducted using a spirometer and a medical gas analyzer in conjunction with an absorbent canister. A spirometer is a device which reproduces the cyclical nature of human respiration. This device was operated at a respiration rate of 18 strokes per minute and a tidal volume of 500 cc. In one minute, 9 liters of air containing 4 percent carbon dioxide were passed through 630 grams of soda lime contained in the absorbent canister. A Beckman-Spinco medical gas analyzer was used to measure the concentration of the carbon dioxide at the inspiration and expiration side of the canister. Testing was continued until traces of carbon dioxide appeared in the effluent stream of the canister which indicated that the carbon dioxide breakpoint had been reached. The time required for the carbon dioxide to break through the absorbent was recorded and is set forth in the table.

Theoretically this canister should hold soda lime in an amount sufficient to maintain a satisfactory absorption when a volume of gas equal to the tidal volume of respiration of the average adult is passed through the lime bed. This tidal volume most usually is about 500 cc. It has been found that when a tidal volume of this amount is passed through the beds that a minimum of about 630 grams of soda lime is necessary to enable the system to maintain an efficient absorption reaction. If the amount of soda lime used is below about 630 grams the decrease in the efficiency of the absorption reaction is very marked. The reason for this is that in a very low void volume, a large part of the gas does not remain in contact with the absorbent throughout the entire absorption cycle. This is due to the fact that a large part of the entering gas is pushed completely through the bed.

The soda lime granules which are utilized should have an average mesh size of between about 4 and about 14 mesh. A relatively large pressure drop will be encountered in the extraction system when an appreciable amount of the soda lime charge has a mesh size smaller than about 14 mesh. However various channeling effects may come into existence when the mesh size of an appreciable quantity of the soda lime charge is larger than about 4 mesh. The average mesh size of the granules which are preferentially used is between about 4 and about 8 mesh.

We have preferentially utilized a cylindrical canister but a wide variety of other shapes may be used if the void volume within the canister is as large as the tidal volume of respiration. It has been found that a cylindrical canister tends to channel at the wall. A large proportion of these wall effects is due to a lack of intermeshing of the surfaces of the granules at the wall. This lack of intermeshing allows a greater gas flow at the wall than within the bed. However as a result of the present treatment with sodium carboxymethylcellulose, this absorbent product is transformed into a coherent, resilient mass. Also as a result of the treatment, the absorbent charge is tightly packed due to the swelling of the sodium carboxymethylcellulose and many of the problems due to these wall effects are thereby decreased. It is also known that if the length of the flow path of the gas in the vicinity of the wall is increased the pressure drop in this vicinity will also increase. Therefore, a screen cone whose shape produces a shorter flow path at the axis of the bed while maintaining the flow path at the wall indirectly achieves this result. Preferentially the ratio of wall to bed depth at the axis should be between about 1.3 and about 1.8 at the wall to about 1 at the axis. A large increase in efficiency is obtained by the use of this screen cone. Optimum efficiency is obtained when the height of the screen cone brings the ratio of wall to bed depth at the axis to about 1.7 at the wall to about 1 at the axis. If the height of the screen cone is drastically increased, then channeling will take place at the axis of the bed. This cone not only functions to adjust the wall to bed depth ratio but it also acts as a retainer for the soda lime charge. This screen cone type retainer also aids in shaping the free-flowing soda lime charge before it is transformed into a coherent and resilient mass. Either the upper or lower retainer, or both, may be intrusive. However, packing of the free-flowing charge is made easier if the retainer at the bottom of the canister is intrusive and the retainer at the top of the bed is flat. Although we have preferentially chosen a conical shape for the intrusive screen retainer other shapes may be used. For instance, either a spherical or parabolic shaped retainer would function quite well for this purpose. The screens from which these retainers are made preferentially have about 200 holes per square inch. These screens should also be preferentially about 0.003 inch in thickness. A finer screen may be used if its strength is reinforced.

While the disposable canister shown in FIGURE 1 is ordinarily made of metal, there are a number of other materials from which it may be made and it may vary in structure. It may be made from any material which is substantially impervious to the transmission of gases particularly carbon dioxide and water and is substantially stable to caustic material such as soda lime. The material should also exhibit a rigidity, either inherently or by way of thickness. Rigidity is necessary to prevent attrition and shifting of the absorbent charge by preventing the collapse of the canister under use. Illustrative materials include polyethylene, Lucite, glass, and metal. Essentially what is required from a structural standpoint is an enclosed container which is provided with opposed perforated sides for the passage of gas therethrough.

In some cases this disposable canister may be used for one working day, i.e. about 8 to about 10 hours. In these situations a typical canister should have a height of about 7 inches and an outside diameter of about 4¼ inches. A cone, having a base diameter less than the inside diameter of the canister, should be positioned in the canister as aforedescribed. Due to the height of the cone the ratio of wall to bed depth at the axis should be about 1.7 at the wall to about 1 at the axis. A can of these dimensions has been known to hold at least about 1000 grams of carboxymethylcellulose treated soda lime having an average mesh size between about 4 and about 8 mesh. A charge of this size can absorb a carbon dioxide flow in the vicinity of about 300 cc. per minute for a period of about 8 hours. When a canister of this size was used the back pressure of the system was found to be as little as about 1 cm. of water at flow rate of 50 liters of anesthesia gas per minute. From this evidence it is apparent that although the present treatment renders lime type absorbents dustless, it does not increase the back pressure of the system to any appreciable extent.

In other cases this type disposable cylinder may be utilized in a conventional stepwise, countercurrent system. In this system two cartridges are placed in series in an anesthesia circuit. They are used serially until a noticeable amount of carbon dioxide breaks through both. When this happens, the upstream cartridge is discarded. The downstream cartridge is moved to the upstream position and a new cartridge is placed in the downstream position. In this case the can should have a height of about 5 inches and a diameter of about 5¼. Due to the height of the cone utilized in the canister the ratio of wall to bed depth at the axis should be about 1.4 at the wall to about 1 at the axis. A canister of these dimensions has been found to hold at least about 1100 grams of soda lime having an average mesh size of between about 4 and about 8 mesh.

The disposable canister provided with soda lime treated by the aforedescribed method has been found to be clean and very conveniently handled. It may be produced and charged by the manufacturer before it is supplied to the medical profession for use in conventional anesthesia circuits. Implicit in the use of this canister is the elimination of spillage and the resultant corrosion that is repugnant to the users of the conventional type canisters. This charged canister may be readily stored. It has been found that ordinary storage intervals will not substantially affect the absorptive capacity of this canister. Of major importance is the fact that this canister may simply be disposed of after its absorbent charge has been exhausted. No longer does a need exist to fill this canister in the hospital. Therefore, no problems arise in the operating room in connection with the corrosive nature of the soda lime absorbent. In summation it may be stated that this canister exhibits a high degree of stable performance characteristics with respect to storage time, rough handling, and careless use.

We claim:

1. A dustless metallic hydroxide absorbent mixture of the soda lime type having a moisture content of between about 5 and 19 percent admixed with about 0.5 to 3.0 percent by weight based on the weight of the absorbent of a dry, powdery, salt selected from the group consisting of an alkali metal salt of carboxymethylcellulose and mixtures thereof.

2. A product according to claim 1 wherein the salt is sodium carboxymethylcellulose.

3. a product according to claim 1 wherein the absorbent mixture is comprised of free flowing particles in admixture with about 0.5 to 1.5 percent by weight of the salt.

4. A product according to claim 1 wherein the absorbent mixture is a coherent, resilient mass in admixture with about 1.5 to 3.0 percent by weight of the salt.

5. The process for imparting anti-dusting properties to the particles of a particulate metallic hydroxide absorbent mixture of the soda lime type having a moisture content between about 5 and 19 percent, which comprises admixing with the said particles between about 0.5 to 3.0 percent by weight based on the weight of the particles of a dry, powdery, salt selected from the group consisting of ah alkali metal salt of carboxymethylcellulose and mixtures thereof.

6. A process according to claim 5 wherein the salt is sodium carboxymethylcellulose.

7. A process according to claim 5 wherein the particles of the absorbent mixture are admixed with 0.5 to 1.5 percent by weight of the salt.

8. A process according to claim 5 wherein the absorbent particles are transformed into a dustless, coherent resilient mass by admixing said particles with between about 1.5 to 3.0 percent by weight based on the weight of the salt.

9. A disposable gas absorbent canister for re-breathing apparatus comprising an enclosed container provided with opposed perforated sides for passage of gas therethrough, and confined therein a charge of a mass of dustless metallic hydroxide absorbent mixture of the soda lime type having a moisture content between about 5 and 19 percent in admixture with about 0.5 to 3.0 percent by weight based on the weight of the absorbent particles of a dry, powdery, salt selected from the group consisting of an alkali metal salt of carboxymethylcellulose and mixtures thereof.

10. A canister according to claim 9 wherein the salt is sodium carboxymethylcellulose.

11. The canister of claim 10 wherein at least one of the ends comprises a conical screen arranged so that the cone protrudes into the mass and has such dimensions that the ratio of the depth of the absorbent mass at the walls of the canister to the depth of the absorbent mass at the axis of the cone is between 1.3 to 1 and 1.8 to 1.

References Cited by the Examiner

UNITED STATES PATENTS

| | | | |
|---|---|---|---|
| 2,470,214 | 5/1949 | Egan | 252—192 |
| 3,047,370 | 7/1962 | Avtges et al. | 23—252 |

MORRIS O. WOLK, *Primary Examiner.*

JAMES H. TAYMAN, JR., *Examiner.*